US012346252B1

(12) United States Patent
Dhakal et al.

(10) Patent No.: US 12,346,252 B1
(45) Date of Patent: Jul. 1, 2025

(54) EFFICIENT KEY-VALUE CACHE MANAGEMENT FOR LARGE LANGUAGE MODELS

(71) Applicant: Hewlett Packard Enterprise Development LP, Spring, TX (US)

(72) Inventors: Aditya Dhakal, Santa Clarita, CA (US); Pedro H. R. Bruel, San Jose, CA (US); Gourav Rattihalli, Milpitas, CA (US); Sai Rahul Chalamalasetti, Newark, CA (US); Dejan S. Milojicic, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/626,045

(22) Filed: Apr. 3, 2024

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................................................. G06F 12/0802
See application file for complete search history.

(56) References Cited

U.S. PATENT DOCUMENTS

2011/0138246 A1* 6/2011 Gardner ............... H04L 1/1874
714/E11.131

* cited by examiner

*Primary Examiner* — Jae U Yu
(74) *Attorney, Agent, or Firm* — Yao Legal Services, Inc.

(57) ABSTRACT

A first NIC monitors a key-value cache associated with an LLM executed by a compute node that includes the first NIC and an accelerator. The key-value cache is stored in a memory associated with the accelerator. Responsive to detecting that the key-value cache is updated by the accelerator, the first NIC transfers a copy of the key-value cache update to a remote storage node. The key-value cache is deleted from the memory after the query is inferred. Responsive to receiving a follow-up user query, the first NIC determines a storage location on the remote storage node that stores the key-value cache corresponding to the user query and sends a KV-cache-transfer request to a second NIC on the remote storage node, the KV-cache-transfer request specifying the storage location, thereby facilitating the second NIC to transfer the key-value cache corresponding to the user query from the specified storage location to the memory.

20 Claims, 6 Drawing Sheets

EFFICIENT KEY-VALUE CACHE MANAGEMENT FOR LARGE LANGUAGE MODELS

BACKGROUND

This disclosure is generally related to managing the memory usage of large language models. More specifically, this disclosure is related to efficiently managing the key-value (KV) cache of an LLM based on triggered operations provided by a programmable network controller (NIC).

BRIEF DESCRIPTION OF THE FIGURES

In the figures, like reference numerals refer to the same figure elements.

DETAILED DESCRIPTION

The emergence of large language models (LLMs) has fundamentally transformed our understanding of natural language processing (NLP). These sophisticated AI systems, characterized by their vast scale and deep learning capabilities, have revolutionized the way machines comprehend, generate, and interact with human language. LLMs often use a Transformer architecture, which consists of multiple layers of self-attention mechanisms, to weigh the importance of different words in a sequence when processing each word, enabling it to capture long-range dependencies effectively.

During the inference phase, an LLM can process an input sequence (e.g., a sentence) token by token, with each token representing a word or sub-word. As the model progresses through the input sequence, it computes intermediate representations (e.g., key-value pairs) for each token based on its context and the surrounding tokens. When the model needs to generate or predict subsequent tokens in a sequence, it can benefit from reusing previously computed representations. For example, when generating the next word in a sentence, the model can leverage the representations of preceding words to inform its prediction. To increase the inference efficiency, the model can store the intermediate key-value pairs in a cache, referred to as a key-value (KV) cache. These key-value pairs correspond to the keys and values used in the self-attention mechanism to compute attention scores for each token. The KV cache can be dynamically updated to incorporate the latest intermediate representations as the model generates new tokens or processes additional user queries to make sure that the model maintains accurate context information throughout the inference process. Caching the intermediate key-value pairs allows the model to efficiently reuse previously computed attention scores and context representations as it progresses through the sequence.

The KV cache may occupy a large amount of memory on the Graphics Processing Unit (GPU) accelerators that perform the inference tasks. The enormous memory requirement of the KV cache may prevent the GPU from running other applications. To free up the GPU memory, some approaches place the KV cache into the memory of the CPU. Considering the high cost associated with the dense CPU double data rate (DDR) memory, some approaches place the KV cache in non-volatile storage devices (e.g., the solid-state drive (SSD)) attached to a remote storage node. However, transferring large amounts of data between the GPU and the remote storage node may add significant network overhead and increase latency. More specifically, such data transfers often require the involvement of the Central Processing Unit (CPU) on the compute node, which is needed to extract the data from the GPU and transfer it to the remote storage node using the network/communication stack on the compute node. Similarly, the CPU on the storage node is needed to receive data through the network/communication stack and write it to the attached SSD. The involvement of the CPUs can add latency and increase the idle time of the GPU as it is waiting for the data to be sent to or received from the remote SSDs.

According to some aspects of the instant application, the KV cache of an LLM can be transferred to a remote storage node's SSD to free up the GPU memory after the system completes a user query and waits for the user's next query. Programmable or smart NICs on the compute and storage nodes can facilitate the data transfer between an accelerator and a remote SSD without the involvement of the CPUs and the network stacks to reduce latency. More specifically, the smart NICs can offload the data transfer from accelerators (e.g., the GPUs) with "triggered operations," in which threads executing on an accelerator can trigger the smart NIC to read data from predefined buffers in the accelerator and transfer the data to a remote storage location via a network of switches.

Figure 1:
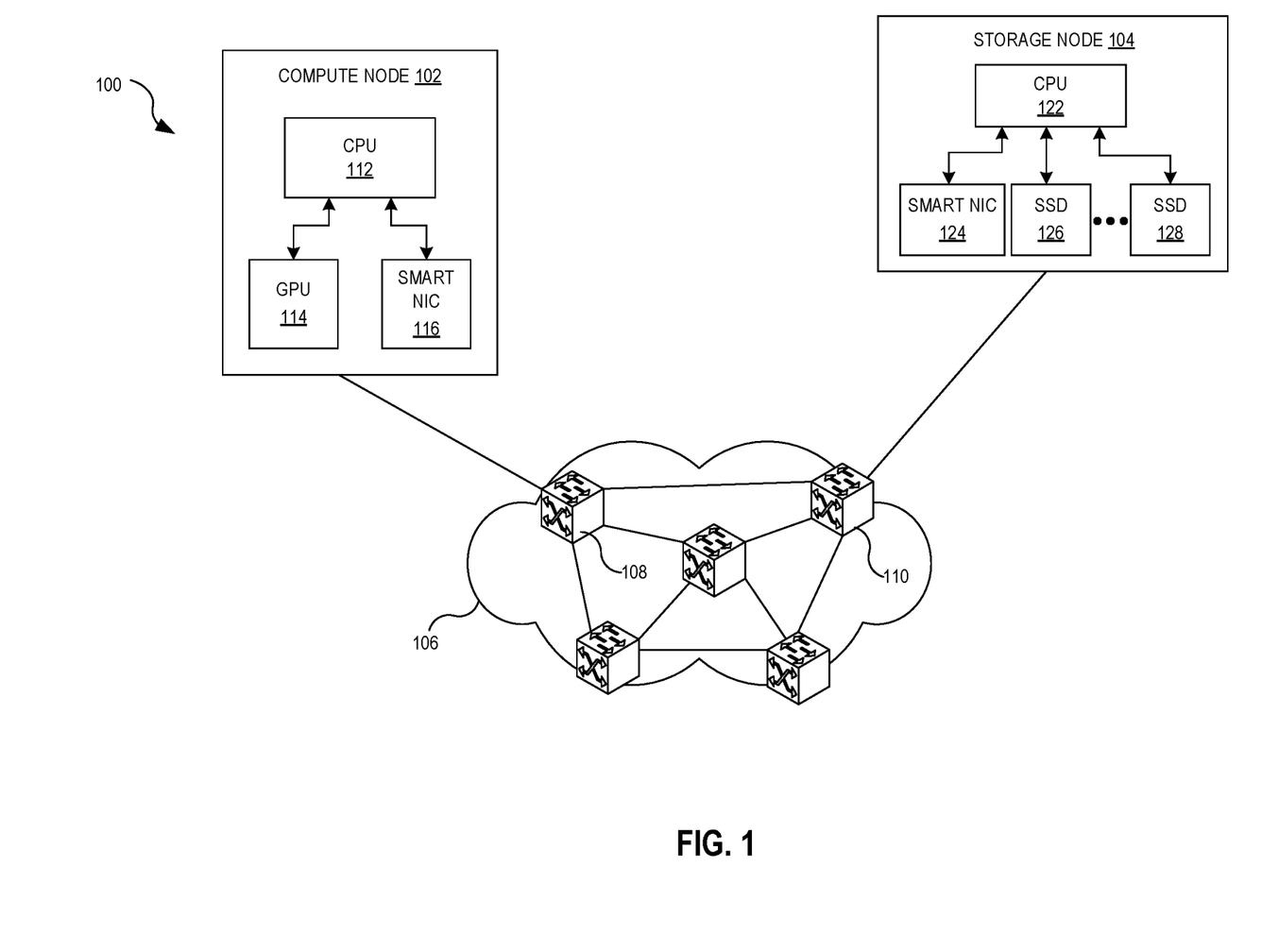
FIG. 1 illustrates an example of the network architecture for transferring the key-value (KV) cache between the compute and storage nodes, according to one aspect of the instant application.

FIG. 1 illustrates an example of the network architecture for transferring the key-value (KV) cache between the compute and storage nodes, according to one aspect of the instant application. In the example shown in FIG. 1, a network 100 can include a compute node 102, a storage node 104, and a switch fabric 106. Compute node 102 can be coupled to storage node 104 via switch fabric 106, which can include a plurality of interconnected switches (e.g., switches 108 and 110).

Compute node 102 can include a CPU 112, an accelerator (e.g., a GPU) 114, and a smart NIC 116. Compute node 102 can be responsible for running the LLM application (e.g., a chat application). Within compute node 102, CPU 112 can be responsible for setting up the LLM in GPU 114 and preconfiguring the triggered operations in smart NIC 116. Because GPUs can include many cores optimized for parallel processing, they are particularly well-suited for the massively parallel computations required in many machine learning algorithms, such as LLM. GPU 114 can be responsible for accelerating the inference tasks. GPU 114 can communicate with CPU 112 via a peripheral component interconnect (PCI) or a PCI-express (PCIe) interface. Smart NIC 116 can provide network connectivity to compute node 102 and typically can include a host interface for coupling to CPU 112 and a network interface for coupling to switch fabric 106. The host interface can be a PCI or PCIe interface. The network interface can support the Institute of Electrical and Electronics Engineers (IEEE) 802.3 Ethernet-based protocols as well as an enhanced frame format that supports higher rates of small messages.

Storage node 104 can be responsible for buffering the KV cache when the LLM application running on compute node 102 is waiting for the next query from the user. Storage node 104 can include a CPU 122, a smart NIC 124, and a number of SSDs (e.g., SSD 126 and SSD 128). Smart NIC 124 can be similar to smart NIC 116 on compute node 102 and can include a host interface for coupling to CPU 122 and a network interface for coupling to switch fabric 106. The SSDs can store the KV cache and can be coupled to CPU 122 via PCIe interfaces.

According to some aspects of the instant application, a smart NIC can include functionalities that can enable off-loading data transfer from the accelerators to the smart NIC via triggered operations. The smart NIC can include a triggered operation (TO) queue that stores a set of pre-programmed data-transfer operations (referred to as triggered operations). When a predetermined trigger condition is met (e.g., a counter value reaches a threshold or a flag is updated), the smart NIC can perform the corresponding data transfer operation. According to some aspects, the data-transfer operations can include remote direct memory access (RDMA) operations, such as "GET" and "PUT" operations.

In LLM applications, memory buffers storing the KV cache can be registered with the smart NIC together with a trigger condition (e.g., a flag). Using FIG. 1 as an example, the KV cache-containing memory buffer of GPU 114 can be registered with smart NIC 116 together with a flag, which can be updated each time the KV cache is updated by GPU 114. According to some aspects of the instant application, GPU 114 can execute a thread that updates the registered flag when new key and value vectors (or KV vectors) are generated. Updating the flag will then trigger smart NIC 116 to transfer a copy of the newly generated KV vectors to a pre-programmed network location, such as storage node 104. For example, for a user query, a predetermined hash function can be used to compute an address for storing the KV cache using keys composed of multiple fields within the user query. This can ensure that a synchronized copy of the KV cache is maintained at storage node 104.

Note that, when storage node 104 is storing KV caches for multiple users, the KV cache update for a particular user can be copied to a user-specific storage location. For example, when GPU 114 updates a KV cache by completing the inference of a query from user A, the GPU thread may trigger smart NIC 116 to transfer the KV cache associated with user A to SSD 126. On the other hand, when GPU 114 completes the inference of a query from user B, the GPU thread may trigger smart NIC 116 to transfer the KV cache associated with user B to SSD 128. It is also possible that KV caches associated with different users are stored on the same SSD but at different addresses. According to some aspects, a hash operation can be applied to the user query to compute the hardware address for storing the user-specific KV cache on the remote storage node. For example, the hash operation may be applied to a unique user ID, the user's IP address, a query ID, or a combination thereof.

Once a copy of the entire KV cache associated with a particular user has been transferred to the remote storage node, the original or local KV cache can be deleted from the GPU's memory to free up the memory space for other users' applications. For example, after smart NIC 116 completes the transfer of all updates of the KV cache to the remote storage node, it can notify the GPU to delete the KV cache from its memory. However, the KV cache may need to be transferred back to the GPU memory when a subsequent query from the same user is received, such that the GPU can take advantage of the intermediate key-value pairs to expedite the inference process. According to some aspects, a smart NIC can include a query parser that can use match-action tables to determine the memory location of the KV cache associated with each user. The smart NIC on the compute node (e.g., smart NIC 116) can then send a KV-cache-transfer request to the remote storage node, requesting the KV cache. The smart NIC on the storage node (e.g., smart NIC 124) can retrieve available portions of the requested KV cache from its SSDs in response to the cache-transfer request.

The KV cache may hold a large amount of data (e.g., hundreds of gigabytes), and it may not be feasible to transfer all data at once. According to some aspects of the instant application, the smart NIC on the storage node may transfer the KV cache portion associated with the initial layers of the LLM first to allow the LLM to start the inference process. In the event that the smart NIC on the storage node may be busy with other tasks, priorities may be given to the KV cache transfer operation. To further reduce the network and memory access latency, the smart NICs can incorporate a prefetch mechanism to prefetch portions of the KV cache and transfer those portions one at a time to the GPU's memory.

Figure 2:
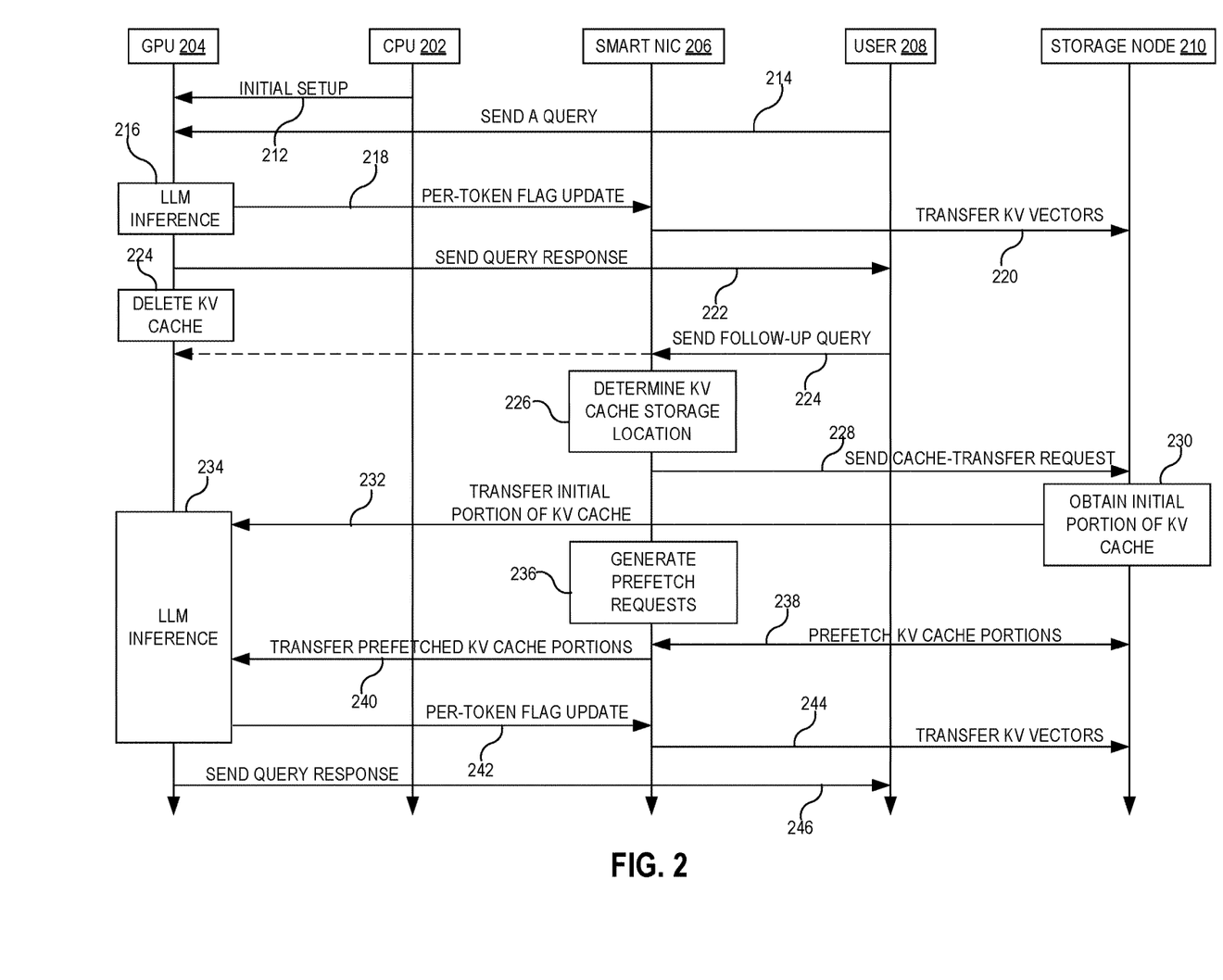
FIG. 2 illustrates an example of the large language model (LLM) inference process, according to one aspect of the instant application.

FIG. 2 illustrates an example of the LLM inference process, according to one aspect of the instant application. In this example, a compute node running the LLM application can include a CPU 202, an accelerator or GPU 204, and a smart NIC 206. At an initial setup stage 212, CPU 202 can load the LLM into the accelerator/GPU and register the GPU memory buffer that stores the KV cache with smart NIC 206. A trigger corresponding to the KV cache can also be registered with smart NIC 206. According to some aspects, the trigger can be a flag field at a particular memory location in GPU 204, and smart NIC 206 can be pre-configured to monitor the flag by periodically reading the memory location. Registering the memory buffer and the trigger allows smart NIC 206 to automatically transfer the KV cache from the memory buffer to a predefined network location (e.g., a remote storage node 210) in response to the trigger condition being met.

In addition to using a flag, other messaging mechanisms can also be used to trigger smart NIC 206 to automatically transfer the KV cache. The LLM can include many attention layers, and each layer can generate a set of KV vectors to be added to the KV cache. In one example, instead of the per-token transfer scheme, the KV cache can also be transferred each time an LLM layer finishes computing and generates a set of KV vectors. In such a situation, a predetermined number of triggers (which corresponds to the number of LLM layers) can be registered or set, with each trigger corresponding to an LLM layer to allow for KV cache transfer each time an LLM layer finishes processing the user query.

A user 208 can send a query to GPU 204 (operation 214). For example, for an LLM-based chat application, the user query can include a sentence (e.g., a question). Responsive to the user query, GPU 204 can perform LLM inference (operation 216). As discussed previously, the LLM inference process can include generating tokens, and a new token can be generated based on previously generated tokens. GPU

204 may store intermediate KV pairs in a KV cache. During LLM inference, the KV cache is updated for each newly generated token.

According to some aspects, for each token generation, GPU 204 can update the triggered-operation (TO) flag, which is monitored by smart NIC 206 (operation 218). In response, smart NIC 206 transfers a copy of the newly generated KV vectors on behalf of GPU 204 to a remote storage node 210 (operation 220). Such a data transfer is performed automatically without the involvement of CPU 202. This data transfer can synchronize the KV cache in remote storage node 210 with the local KV cache in GPU 204. Note that operations 218 and 220 can be repeated during the LLM inference for each generated token. The KV cache is user-specific. KV caches associated with different users should be stored at different storage locations (e.g., at different addresses). According to some aspects, smart NIC 206 can perform a hash operation based on the user query to compute the storage address on storage node 210.

FIG. 2 only shows one storage node. In practice, the compute node may be coupled, via a switch fabric, to a plurality of storage nodes, and it is possible that the KV cache can be distributed across multiple storage nodes.

Subsequent to GPU 204 completing the LLM inference, a query response can be sent to user 208 (operation 222), and GPU 204 can delete the KV cache specific to this particular user (operation 224). According to some aspects, smart NIC 206 can send a notification to GPU 204 once it completes the transferring of all updates of the KV cache to notify GPU 204 that the local KV cache can be deleted. Deleting the local KV cache frees up the memory space in GPU 204, thus allowing GPU 204 to run other applications, such as performing LLM inference for other users.

In the example shown in FIG. 2, the KV cache local to GPU 204 is dynamically synchronized with a remote KV cache stored on a remote storage node. Each update to the local KV cache is timely copied to the remote storage node to update the remote KV cache. It is also possible to withhold the updates and send a copy of the entire local KV cache to the remote storage node after the user query is inferred by GPU 204.

User 208 may subsequently send a follow-up query (224), which can be received by smart NIC 206 and then forwarded to GPU 204. Inference of the follow-up query can benefit from the KV cache, which currently is not available in the memory of GPU 204. Responsive to the follow-up user query, smart NIC 206 can determine, based on the follow-up query, the storage location of the KV cache corresponding to the user (operation 226). The user can be identified by a unique user ID, an IP address, or a query ID. According to some aspects of the instant application, smart NIC 206 can include a query parser that can parse the user query (e.g., using match-action tables) to map the user to a corresponding storage location on storage node 210. In one example, the query parser can be implemented as a P4 (Programming Protocol-Independent Packet Processors) engine.

Once the storage location of the user-specific KV cache is determined, smart NIC 206 can send a KV-cache-transfer request to storage node 210 to request the KV cache (operation 228). In response, the smart NIC on storage node 210 can access the particular storage location to obtain the initial portion of the KV cache (operation 230) and transfer it to the memory of GPU 204 (operation 232). According to some aspects, SSD drives in storage node 210 can include NVM Express over fabrics (NVMe-oF) drives, and the smart NIC on storage node 210 can use submission and completion queues in the SSD drives with the address information of the memory of GPU 204. The SSD drives can then be responsible for writing the content of the KV cache through RDMA to the memory of GPU 204. Note that the KV cache can be large, and the RDMA operation may only transfer a portion of the KV cache. In one example, the portion of the KV cache useful to the initial few layers of the LLM can be transferred to the memory of GPU 204 via the RDMA operation.

Transferring the initial portion of the KV cache can allow GPU 204 to start the LLM interference process (operation 234). While GPU 204 is performing inference, to reduce latency, smart NIC 206 can generate requests to prefetch KV cache portions that can be used by subsequent LLM layers (operation 236). Smart NIC 206 can further prefetch KV cache portions from storage node 210 based on the prefetch requests (operation 238).

According to some aspects, the KV cache portions can be prefetched sequentially according to the LLM layer structure. KV cache portions associated with earlier LLM layers can be prefetched first, followed by portions associated with later LLM layers. According to alternative aspects, the prefetching can be performed according to different address orders. For example, the KV cache portions can be prefetched sequentially with incrementing addresses, sequentially with decrementing addresses, or using a strided or random-access pattern. The prefetched KV cache portions can be buffered in a prefetch queue in smart NIC 206. Smart NIC 206 can manage prefetch operations based on memory and bandwidth constraints. Smart NIC 206 can transfer the KV cache portion corresponding to each prefetch request, one portion at a time, to the memory of GPU 204 (operation 240). The transferred KV cache portions can be populated in appropriate buffers in the memory of GPU 204 to facilitate the LLM inference.

In the example in FIG. 2, smart NIC 206 performs the prefetch operation and buffers the prefetched KV cache portions in its memory, which is closer to GPU 204. This approach can provide the benefit of lower latency for transferring data to GPU 204. However, the amount of memory provided by smart NIC 206 may be limited. In alternative approaches, the smart NIC on storage node 210 can prefetch the KV cache portions from the SSD drives and buffer the prefetched portions in its prefetch queues. When prefetch is performed at the local storage level, the memory constraint on smart NIC 206 can be solved. Moreover, the smart NIC on storage node 210 can be knowledgeable about the storage medium and system architecture optimizations (e.g., interleaving, storage-level access, etc.) and can perform effective optimization of prefetching. According to some aspects of the instant application, both NICs can be involved in prefetch operations.

During the inference of the follow-up query, GPU 204 can update the triggered-operation (TO) flag for each generated token (operation 242), which triggers smart NIC 206 to transfer a copy of the newly generated KV vectors to remote storage node 210 (operation 244). After completing the LLM inference of the follow-up user query, GPU 204 sends the query response to user 208 (operation 246).

Figure 3:
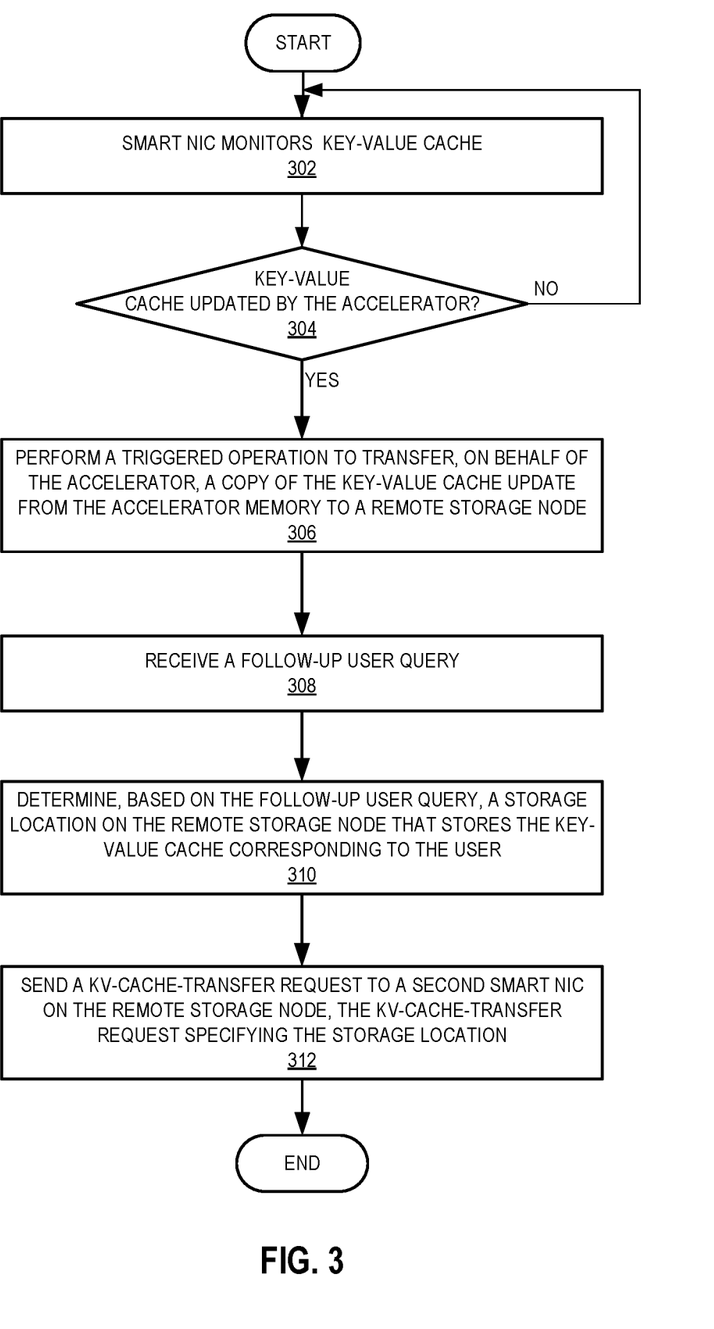
FIG. 3 presents a flowchart illustrating the operation process of a smart network interface controller (NIC) of a compute node, according to one aspect of the instant application.

FIG. 3 presents a flowchart illustrating the operation process of a smart network interface controller (NIC) of a compute node, according to one aspect of the instant application. In this example, the smart NIC is part of the compute node that executes the LLM to infer a query from a user. The compute node can also include an LLM accelerator, which can include a GPU. The GPU can be used to accelerate the LLM inference. During inference, intermediate KV pairs (i.e., key and value vectors) can be stored in the GPU's memory as a KV cache.

During operation, the smart NIC can monitor a key-value cache associated with the LLM (operation 302). According to some aspects, the smart NIC can monitor the key-value cache by reading one or more memory locations in the GPU's memory. A thread executing on the GPU may update flags stored in those memory locations. In one example, when the LLM generates a new token, a flag corresponding to the new token generation can be updated (e.g., a token count may be incremented). In another example, when a particular attention layer of the LLM finishes computation, a flag corresponding to that particular layer can be updated. Other message-passing mechanisms can also be used to allow the smart NIC to monitor the state of the key-value cache in the GPU's memory (referred to as a local key-value cache).

The smart NIC can determine whether the local key-value cache is updated by the accelerator (operation 304). For example, the smart NIC can monitor the new token generation flag to determine that the key-value cache is updated by a new token. Alternatively, the smart NIC can monitor a flag corresponding to an LLM layer to determine that the key-value cache is updated by that LLM layer. If the local key-value cache is not updated, the smart NIC continues to monitor the local key-value cache (operation 302). Otherwise, the smart NIC can perform a triggered operation to transfer, on behalf of the accelerator, a copy of the key-value cache update from the memory associated with the accelerator to a remote storage node (operation 306). According to some aspects of the instant application, newly generated KV vectors can be copied from the GPU memory buffers into the remote storage node without the involvement of the compute node's CPU. Note that conventional LLM applications typically require the CPU threads of the compute node to orchestrate the data-moving communication between the compute node and the storage node.

Before transferring the newly generated KV vectors to the remote storage, the smart NIC may determine a hardware (e.g., SSD) address for storing the remote KV cache. According to some aspects, a hash operation can be performed based on metadata associated with the user query. The metadata can include the user's ID, IP address, query ID, etc. After the user query is inferred, the GPU can delete the KV cache from its memory.

The smart NIC can subsequently receive a follow-up user query (operation 308) and determine, based on the follow-up user query, a storage location on the remote storage node that stores the key-value cache corresponding to the user (operation 310). According to some aspects of the instant application, the smart NIC can include a query parser that can parse the user query based on one or more match-action tables. The query parser can be implemented as a P4 (Programming Protocol-Independent Packet Processors) engine.

The smart NIC can then send a KV-cache-transfer request to a second smart NIC on the remote storage node (operation 312). The KV-cache-transfer request can specify the storage location that stores the KV cache corresponding to the user. Upon receiving the KV-cache-transfer request, the second smart NIC on the remote storage node can parse the request (e.g., using match-action tables) to obtain the storage location and forward the request to the respective storage device (e.g., SSD). According to some aspects, the SSDs in the storage node can include Non-Volatile Memory Express (NVMe) drives, and the second smart NIC can use submission and completion queues on the SSD to facilitate the SSD to transfer portions of the KV cache to the GPU's memory through RDMA operations (e.g., RDMA PUT operations).

Figure 4:
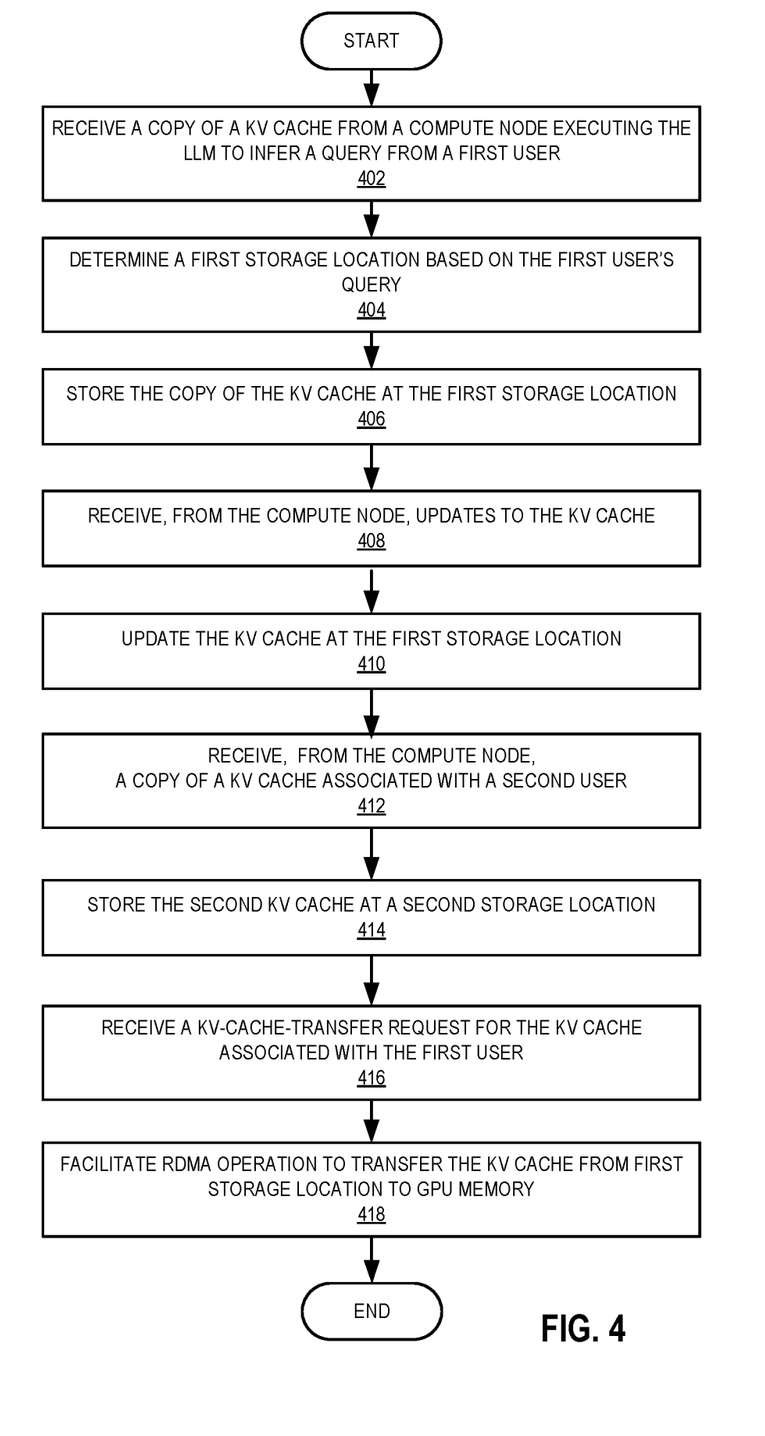
FIG. 4 presents a flowchart illustrating the operation process of a smart network interface controller (NIC) of a storage node, according to one aspect of the instant application.

FIG. 4 presents a flowchart illustrating the operation process of a smart network interface controller (NIC) of a storage node, according to one aspect of the instant application. In this example, the smart NIC is part of the storage node that stores KV caches generated by an LLM while inferring queries from different users.

During operation, the smart NIC of the storage node can receive a copy of a KV cache from a compute node executing the LLM to infer a query from a first user (operation 402). The smart NIC can determine a first storage location based on the first user's query (operation 404) and store the copy of the KV cache at the determined first storage location (operation 406). According to some aspects, the smart NIC can apply a predetermined hash operation on metadata associated with the first user's query to determine a hardware address for storing the KV cache associated with the first user.

The smart NIC of the storage node can subsequently receive, from the compute node, updates to the KV cache (operation 408). More specifically, the smart NIC of the compute node can be triggered, by a thread running on the GPU performing the LCM inference, to transfer a copy of the KV cache updates from the GPU memory to the storage node. The smart NIC can update the KV cache at the first storage location based on received updates (operation 410). The updates can include newly generated KV vectors.

The smart NIC of the storage node can also receive, from the compute node, a copy of a second KV cache associated with a second user (operation 412) and store the second KV cache at a second storage location (operation 414). The NIC of the compute node can determine the second storage location based on the metadata of the second user's query.

The smart NIC of the storage node can receive a KV-cache-transfer request from the compute node, requesting the KV cache associated with the first user (operation 416). This KV cache is needed at the compute node when a follow-up query is received from the first user. The KV-cache-transfer request can specify the first storage location. In response, the smart NIC on the storage node can facilitate an RDMA operation to transfer the KV cache from the first storage location to the GPU memory on the compute node (operation 418). In one example, the smart NIC of the storage node can use the submission-completion queuing mechanism to facilitate the data transfer. For example, the smart NIC can queue a data-transfer command (e.g., an RDMA PUT command) that specifies the GPU buffer address into a submission queue on the SSD storing the KV cache. After executing the data-transfer command, the SSD can move the command into a completion queue.

To reduce latency, the smart NIC may only transfer a portion of the first user's KV cache using the RDMA operation. The transferred portion of the KV cache can facilitate the first few layers of the LLM to start inference on the follow-up query. While LLM inference is ongoing, the smart NIC on the storage node can prefetch other portions of the first user's KV cache from the first storage location before transferring them to the compute node. Moreover, the smart NIC on the compute node can also prefetch the KV cache portions from the smart NIC on the storage node. These prefetch operations can further reduce the network and memory-access latencies.

Although the example processes shown in FIGS. 3 and 4 demonstrate a specific order of performing certain functionalities, the actual processes are not limited to such order. For example, the functionalities shown in succession in the flowcharts may be performed in a different order, may be executed concurrently, or with partial concurrence or combinations thereof.

Figure 5:
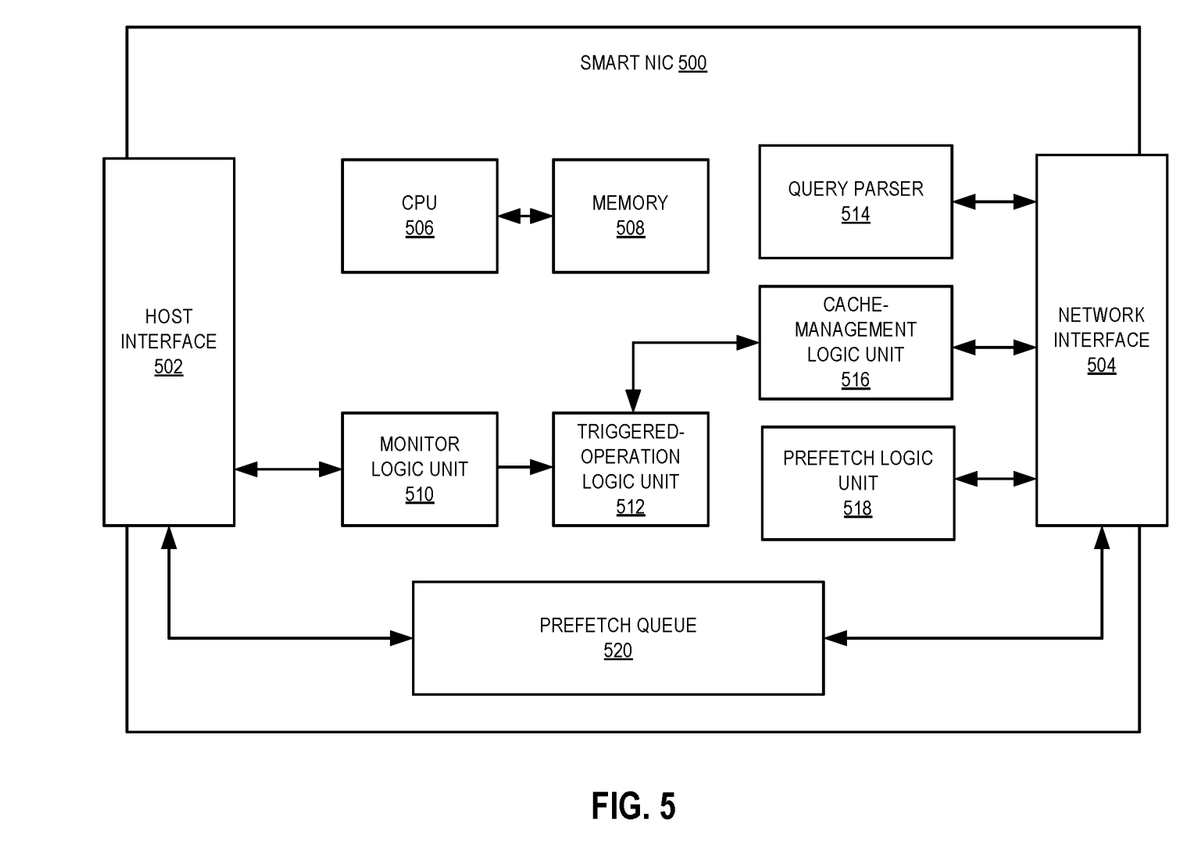
FIG. 5 illustrates an example of the block diagram of a smart NIC, according to one aspect of the instant application.

FIG. 5 illustrates an example of the block diagram of a smart NIC, according to one aspect of the instant application. A smart NIC 500 can include a host interface 502, a network interface 504, a CPU 506, a memory 508, a monitor logic unit 510, a triggered-operation logic unit 512, a query parser 514, a cache-management logic unit 516, a prefetch logic unit 518, and a prefetch queue 520. Note that FIG. 5 shows various logic units that are pertaining to the management of the KV caches. A smart NIC can include other logic units not shown in FIG. 5. The various logic units shown in FIG. 5 can be implemented using hardware logic, software logic, and a combination thereof. The logic units may communicate with one another via a wired, wireless, quantum light, or electrical communication channel. Smart NIC 500 may be realized using one or more integrated circuits and may include fewer or more units than those shown in FIG. 5. Further, smart NIC 500 may be integrated into a computer system or realized as a separate device that is capable of communicating with other computer systems and/or devices.

Host interface 502 can be used to couple to the host (e.g., the CPU of a compute or storage node) and can be a peripheral component interconnect (PCI) or a peripheral component interconnect express (PCIe) interface. Network interface 504 can facilitate a high-speed network connection to a link in switch fabric 106 shown in FIG. 1. Network interface 504 can support Ethernet-based protocols as well as an enhanced frame format that supports higher rates of small messages.

CPU 506 can be the brain of smart NIC 500 and can be responsible for keeping track of user queries and cache management (e.g., memory 508) using various algorithms, such as the Least Recently Used (LRU) or timer-based cache-eviction algorithm. According to some aspects, CPU 506 can include a low-power CPU core.

Monitor logic unit 510 can be responsible for monitoring the KV cache stored in the accelerator (e.g., a GPU) memory. According to some aspects, monitor logic unit 510 can process a small message sent by the GPU to determine whether the KV cache has been updated. According to alternative aspects, monitor logic unit 510 can determine the status of one or more flags stored in a predetermined GPU memory location to determine the state of the KV cache. In one example, the GPU can be configured to write to that predetermined memory location each time the KV cache is updated (e.g., each time a new token is generated) or each time an LLM layer finishes computation or processing of a user query. In one example, monitor logic unit 510 can monitor a plurality of flags, one for each LLM layer.

Triggered-operation logic unit 512 can be responsible for performing triggered operations. More specifically, triggered-operation logic unit 512 can include a triggered-operation queue that can store a set of predetermined triggered operations. Each triggered operation can correspond to a trigger or flag monitored by monitor logic unit 510. When monitor logic unit 510 detects a trigger event (e.g., a flag being updated), triggered-operation logic unit 512 can perform a corresponding triggered operation, such as transferring the KV cache to a predetermined remote storage location. The storage location is user-specific, and triggered-operation logic unit 512 can be responsible for transferring the KV cache associated with a particular user (i.e., the KV cache is generated during the inference of a query from that particular user) to a storage location corresponding to that particular user. In one example, each LLM layer can be associated with a trigger/flag. When an LLM layer finishes computing, the corresponding flag can be updated and detected by monitor logic unit 510. Triggered-operation logic unit 512 can transfer a copy of the KV vectors generated by the LLM layer to the predetermined storage address.

Query parser 514 can be responsible for parsing communication packets, including user queries, received at smart NIC 500. According to some aspects, query parser 514 can include a P4 engine that parses incoming packets based on a set of match-action tables. For example, when a user query is received, query parser 514 can parse the user query to obtain the metadata (which can include a user ID, an IP address, a query ID, etc.). The metadata can be used to determine a remote storage location for storing the KV cache associated with the user. Moreover, when implemented on the NIC belonging to a storage node (e.g., NIC 124 shown in FIG. 1), query parser 514 can parse the KV-cache-transfer request sent by the compute node's NIC to determine whether the KV-cache-transfer request is for reading the KV-cache from or writing the KV-cache to the storage location.

Cache-management logic unit 516 can be responsible for managing the storage and retrieval of the KV cache. Cache-management logic unit 516 can include a hash logic that can perform a predetermined hash operation on the metadata of the user's query. According to some aspects, cache-management logic unit 516 can also manage the KV cache based on its size and the network bandwidth constraint. For example, as the size of the KV cache increases, cache-management logic unit 516 can request additional space from the remote storage node for storing the KV cache. Moreover, when a follow-up query is received from the user, cache-management logic unit 516 can generate and send a KV-cache-transfer request to the remote storage node.

Prefetch logic unit 518 can be responsible for prefetching KV cache portions from the remote storage location while the GPU in the compute node is performing inference. The large and unpredictable size of the KV cache means that it is not practical to transfer the entire KV cache at once. Transferring an initial portion of the KV cache (e.g., via an RDMA operation orchestrated by the NIC of the storage node) can allow the first few layers of the LLM to start inference. In the meantime, the smart NICs can prefetch subsequent portions of the KV cache, thus further hiding the network and memory-access latency. In one example, the NIC of the storage node can prefetch KV cache portions from the SSDs. In another example, the NIC of the compute node can prefetch KV cache portions from the SSDs directly or from the storage node's NIC. In one more example, both smart NICs can participate in the prefetch operations. The prefetched KV cache portions can be placed in a prefetch queue 520 before they are transferred toward the GPU memory.

Figure 6:
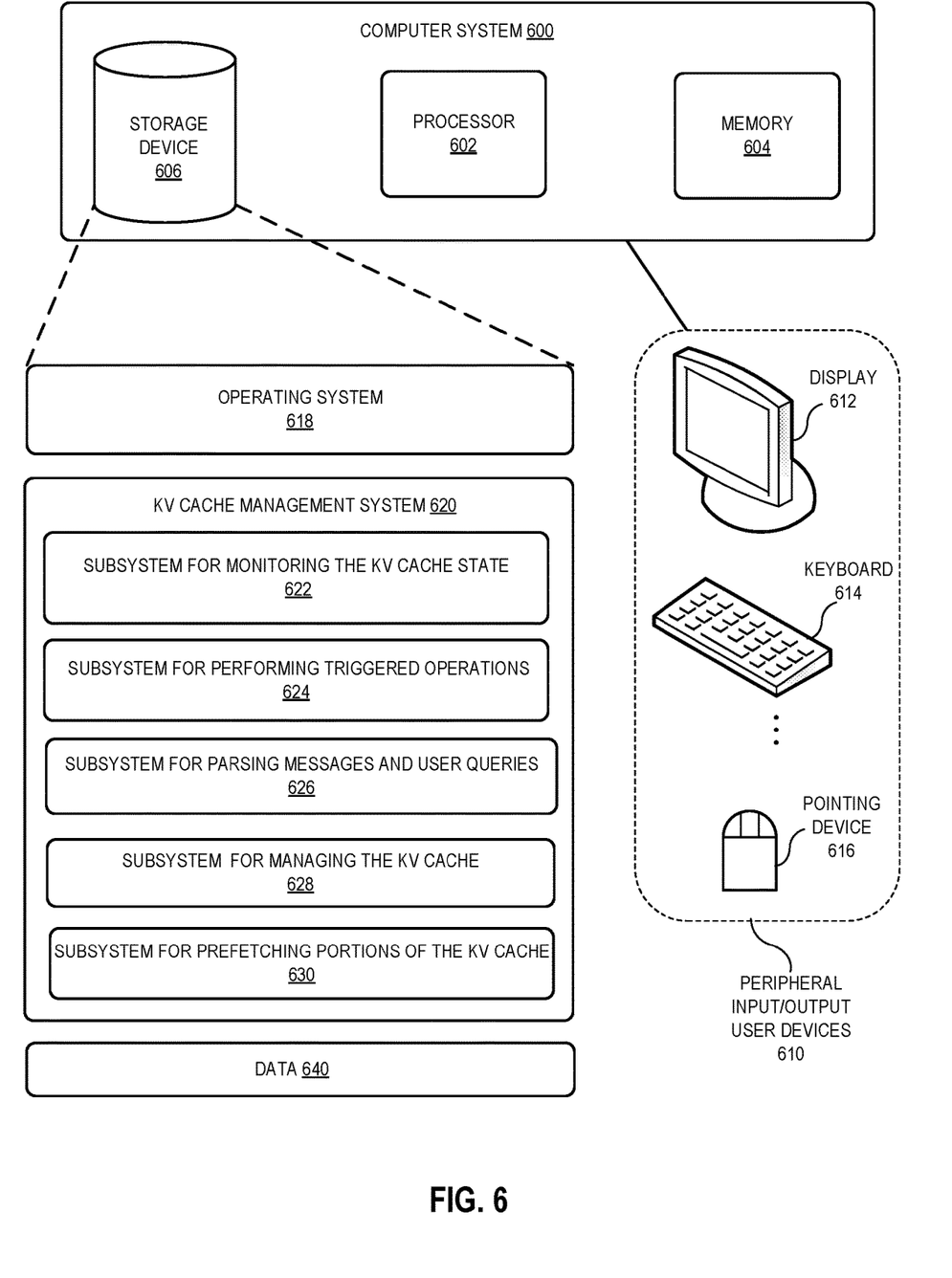
FIG. 6 illustrates an example of a computer system that facilitates efficient KV cache management, according to one aspect of the instant application.

FIG. 6 illustrates an example of a computer system that facilitates efficient KV cache management, according to one aspect of the instant application. Computer system 600 can include a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, a KV cache management system 620, and data 640. According to some aspects, computer system 600 can be implemented as part of a NIC on a compute or storage node (e.g., smart NIC 116 or smart NIC 124 shown in FIG. 1).

KV cache management system 620 can include instructions, which when executed by computer system 600, can cause computer system 600 or processor 602 to perform methods and/or processes described in this disclosure, such as the methods and/or processes shown in FIGS. 3 and 4. Specifically, by executing these instructions, computer system 600 can achieve the goal of dynamically transferring the KV cache between the GPU memory performing the LLM inference and the remote storage node.

KV cache management system 620 can include instructions for monitoring the KV cache state in the memory of an accelerator/GPU that performs LLM inference (subsystem 622). According to some aspects, subsystem 622 can determine whether the KV cache in the GPU memory is updated by monitoring a flag field at a predetermined location in the GPU memory.

KV cache management system 620 can include instructions for performing triggered operations, which can include transferring a copy of the KV cache update (e.g., newly generated KV vectors) to remote storage locations (subsystem 624). Such triggered operations can be performed automatically and do not involve the CPU of the compute node.

KV cache management system 620 can include instructions for parsing messages and user queries (subsystem 626). According to some aspects, subsystem 626 can parse a user query to obtain metadata of the user query.

KV cache management system 620 can include instructions for managing the KV cache (subsystem 628). When a KV cache associated with a user needs to be stored in a remote storage node, subsystem 628 can apply a predetermined hash function on the metadata included in the user's query to compute the hardware address for storing the KV cache. When the KV cache associated with that user needs to be transferred back to the GPU to facilitate inference of the user's subsequent query, subsystem 628 can generate and send a KV-cache-transfer request to the storage node storing the user's KV cache.

KV cache management system 620 can include instructions for prefetching portions of the KV cache (subsystem 630). While a user query is being inferred, subsystem 630 can prefetch portions of the KV cache from the storage node, one portion at a time. According to some aspects, subsystem 630 can perform the prefetching according to various address orders. For example, subsystem 630 can prefetch portions of the KV cache from the storage node sequentially with incrementing addresses, sequentially with decrementing addresses, or using a strided or random-access pattern. When implemented on the smart NIC of a storage node storing the KV cache, subsystem 630 can prefetch the KV cache portions from the storage devices (e.g., SSDs). When implemented on the smart NIC of a compute node requesting the KV cache, subsystem 630 can prefetch the KV cache portions from the smart NIC of the storage node. Subsystem 630 can temporarily buffer the prefetched KV cache portions in the prefetch queue on the NIC.

In general, the disclosure describes a system and method for efficiently managing the KV caches of an LLM. When an accelerator or GPU on a compute node performs LLM inference of a user query, the local KV cache in the GPU memory can be dynamically synchronized with a remote KV cache at a remote storage location (e.g., an SSD in a remote storage node). More specifically, the smart NIC of the compute node can be configured with one or more triggered operations such that, after the generation of each new token or after each LLM layer finishes computation, the smart NIC can be triggered to automatically transfer a copy of the newly generated KV vectors to the remote storage node. These triggered operations are performed without the involvement of the CPU of the compute node, thus reducing latency. After a user query is inferred, the local KV cache can be deleted to free up the GPU memory. When needed (e.g., when a follow-up user query is received by the GPU), the remote KV cache can be transferred back to the GPU memory. More specifically, the smart NIC of the storage node can use submission and completion queues within the storage device (e.g., an SSD) to facilitate an RDMA operation that can directly move an immediately needed portion of the remote KV cache back to the GPU memory. To further reduce latency, while the GPU is inferring, the smart NICs of the compute and storage nodes can collaboratively prefetch subsequent portions of the KV cache.

One aspect of the instant application can provide a system and method for managing the key-value cache of a large language model (LLM). During operation, a first network interface controller (NIC) can monitor a key-value cache associated with the LLM, which is executed by a compute node to infer a query from a user. The compute node can include the first NIC and an accelerator, and the key-value cache is stored in a memory associated with the accelerator. In response to detecting that the key-value cache is updated by the accelerator, the first NIC can transfer, on behalf of the accelerator, a copy of the key-value cache update to a remote storage node. The key-value cache is then deleted from the memory after the query is inferred, thereby allowing the memory to be used for storing key-value caches associated with other users. In response to receiving a follow-up query from the user, the first NIC can determine a storage location on the remote storage node that stores the key-value cache corresponding to the user and send a key-value (KV)-cache-transfer request to a second NIC on the remote storage node, the KV-cache-transfer request specifying the storage location, thereby facilitating the second NIC to transfer the key-value cache corresponding to the user from the specified storage location to the memory associated with the accelerator.

In a variation on this aspect, detecting that the key-value cache is updated can include detecting that the LLM inference generates a new token or detecting that an LLM layer finishes processing the query.

In a variation on this aspect, the first NIC on the compute node can receive a registration message from the accelerator indicating a memory location for buffering the key-value cache and one or more triggers, and detecting that the key-value cache is updated comprises determining that a trigger condition is met.

In a variation on this aspect, transferring the copy of the key-value cache update from the memory associated with the accelerator to the remote storage node can be performed by the NIC without processing by the compute node's central processing unit (CPU).

In a variation on this aspect, transferring the key-value cache corresponding to the user from the specified storage location on the storage node to the memory associated with the accelerator can include performing a remote direct memory access (RDMA) operation to transfer an initial portion of the key-value cache.

In a further variation, the first NIC can generate a plurality of prefetch requests, with a respective prefetch request corresponding to a portion of the key-value cache, and prefetch portions of the key-value cache from the remote storage node based on the prefetch requests.

In a further variation, the prefetched portions can be buffered in a first prefetch queue located on the first NIC, a second prefetch queue located on the second NIC, or both.

In a variation on this aspect, transferring the key-value cache corresponding to the user from the specified storage location on the storage node to the memory associated with the accelerator can be performed without processing by the storage node's CPU.

In a variation on this aspect, determining the storage location can include parsing the query based on one or more match-action tables.

In a variation on this aspect, transferring the copy of the key-value cache update can include applying a hash operation based on the query to compute an address of the storage location.

One aspect of the instant application can provide a network interface controller (NIC). The NIC can include a monitor logic unit to monitor a key-value cache associated with a large language model (LLM), the LLM being executed by a compute node to infer a query from a user, the compute node comprising the NIC and an accelerator, and the key-value cache being stored in a memory associated with the accelerator. The NIC can include a triggered operation logic unit to, in response to the monitor logic unit detecting that the key-value cache is updated by the accelerator, transfer on behalf of the accelerator a copy of the key-value cache update to a remote storage node and notify the accelerator after the query is inferred and all updates of the key-value cache are transferred to the remote storage node to allow the key-value cache to be deleted from the memory and the memory to be used for storing key-value caches associated with other users. The NIC can further include a query parser to parse a follow-up query from the user to determine a storage location on the remote storage node that stores the key-value cache corresponding to the user and a cache-management logic unit to send a KV-cache-transfer request to a second NIC on the remote storage node, the KV-cache-transfer request specifying the storage location, thereby facilitating the second NIC to transfer the key-value cache corresponding to the user from the specified storage location to the memory associated with the accelerator.

One aspect of the instant application can provide a system. The system can include a compute node executing a large language model (LLM) to infer a query from a user and a storage node coupled to the compute node via a network. The compute node can include a first network interface controller (NIC) and an accelerator, and the storage node can include a second NIC and one or more storage device. The first NIC can include a monitor logic unit to monitor a key-value cache associated with the LLM, the key-value cache being stored in a memory associated with the accelerator. The first NIC can include a triggered operation logic unit to, in response to the monitor logic unit detecting that the key-value cache is updated by the accelerator, transfer on behalf of the accelerator a copy of the key-value cache update to the storage node and notify the accelerator after the query is inferred and all updates of the key-value cache are transferred to the storage node to allow the key-value cache to be deleted from the memory and the memory to be used for storing key-value caches associated with other users. The first NIC can further include a query parser to parse a follow-up query from the user to determine a storage location on the storage node that stores the key-value cache corresponding to the user and a cache-management logic unit to send a KV-cache-transfer request to the second NIC, the KV-cache-transfer request specifying the storage location, thereby facilitating the second NIC to transfer the key-value cache corresponding to the user from the specified storage location to the memory.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The above description is presented to enable any person skilled in art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a non-transitory computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method, comprising:
monitoring, by a first network interface controller (NIC), a key-value cache associated with a large language model (LLM), the LLM being executed by a compute node to infer a query from a user, the compute node comprising the first NIC and an accelerator, and the key-value cache being stored in a memory associated with the accelerator;
in response to detecting that the key-value cache is updated by the accelerator, transferring, by the first NIC on behalf of the accelerator, a copy of the key-value cache update to a remote storage node;

deleting the key-value cache from the memory after the query is inferred, thereby allowing the memory to be used for storing key-value caches associated with other users;

in response to receiving a follow-up query from the user, determining, by the first NIC, a storage location on the remote storage node that stores the key-value cache corresponding to the user; and sending a key-value (KV)-cache-transfer request to a second NIC on the remote storage node, the KV-cache-transfer request specifying the storage location, thereby facilitating the second NIC to transfer the key-value cache corresponding to the user from the specified storage location to the memory associated with the accelerator.

2. The method of claim 1, wherein detecting that the key-value cache is updated comprises:

detecting that the LLM inference generates a new token; or detecting that an LLM layer finishes processing the query.

3. The method of claim 1, further comprising:

receiving, by the first NIC on the compute node, a registration message from the accelerator indicating a memory location for buffering the key-value cache and one or more triggers;

wherein detecting that the key-value cache is updated comprises determining that a trigger condition is met.

4. The method of claim 1, wherein transferring the copy of the key-value cache update from the memory associated with the accelerator to the remote storage node is performed by the NIC without processing by the compute node's central processing unit (CPU).

5. The method of claim 1, wherein transferring the key-value cache corresponding to the user from the specified storage location on the storage node to the memory associated with the accelerator comprises performing a remote direct memory access (RDMA) operation to transfer an initial portion of the key-value cache.

6. The method of claim 5, further comprising:

generating, by the first NIC, a plurality of prefetch requests, with a respective prefetch request corresponding to a portion of the key-value cache; and prefetching portions of the key-value cache from the remote storage node based on the prefetch requests.

7. The method of claim 6, further comprising buffering the prefetched portions in a first prefetch queue located on the first NIC, a second prefetch queue located on the second NIC, or both.

8. The method of claim 1, wherein transferring the key-value cache corresponding to the user from the specified storage location on the storage node to the memory associated with the accelerator is performed without processing by the storage node's CPU.

9. The method of claim 1, wherein determining the storage location comprises parsing the query based on one or more match-action tables.

10. The method of claim 1, wherein transferring the copy of the key-value cache update comprises applying a hash operation based on the query to compute an address of the storage location.

11. A network interface controller (NIC), comprising:

a monitor logic unit to monitor a key-value cache associated with a large language model (LLM), the LLM being executed by a compute node to infer a query from a user, the compute node comprising the NIC and an accelerator, and the key-value cache being stored in a memory associated with the accelerator;

a triggered operation logic unit to:

in response to the monitor logic unit detecting that the key-value cache is updated by the accelerator, transfer on behalf of the accelerator a copy of the key-value cache update to a remote storage node; and notify the accelerator after the query is inferred and all updates of the key-value cache are transferred to the remote storage node to allow the key-value cache to be deleted from the memory and the memory to be used for storing key-value caches associated with other users;

a query parser to parse a follow-up query from the user to determine a storage location on the remote storage node that stores the key-value cache corresponding to the user; and a cache-management logic unit to send a key-value (KV)-cache-transfer request to a second NIC on the remote storage node, the KV-cache-transfer request specifying the storage location, thereby facilitating the second NIC to transfer the key-value cache corresponding to the user from the specified storage location to the memory associated with the accelerator.

12. The NIC of claim 11, wherein the monitor logic unit is to detect that the key-value cache is updated by detecting:

a new token being generated by the LLM; or an LLM layer finishing processing the user query.

13. The NIC of claim 11, wherein the triggered operation logic unit is to receive a registration message from the accelerator indicating a memory location for buffering the key-value cache and one or more triggers; and wherein the monitor logic unit is to detect that the key-value cache is updated based on a trigger condition being met.

14. The NIC of claim 11, wherein the triggered operation logic unit is to transfer the copy of the key-value cache update from the memory to the remote storage node without involving the compute node's central processing unit (CPU).

15. The NIC of claim 11, wherein a triggered operation logic unit on the second NIC is to perform a remote direct memory access (RDMA) operation to transfer an initial portion of the key-value cache from the specified storage location on the storage node to the memory associated with the accelerator.

16. The NIC of claim 15, further comprising a prefetch logic unit to:

generate a plurality of prefetch requests, with a respective prefetch request corresponding to a portion of the key-value cache; and prefetch portions of the key-value cache from the remote storage node based on the prefetch requests.

17. The NIC of claim 16, wherein the prefetch logic unit is to buffer the prefetched portions in a first prefetch queue located on the first NIC, a second prefetch queue located on the second NIC, or both.

18. The NIC of claim 11, wherein the query parser is to determine the storage location based on one or more match-action tables.

19. The NIC of claim 11, wherein the cache-management logic unit is to apply a hash operation based on the query to compute an address of the storage location on the remote storage node to store the key-value cache corresponding to the user.

20. A system, comprising:
a compute node executing a large language model (LLM) to infer a query from a user, the compute node comprising a first network interface controller (NIC) and an accelerator; and
a storage node coupled to the compute node via a network, the storage node comprising a second NIC and one or more storage devices;
wherein the first NIC comprises:
- a monitor logic unit to monitor a key-value cache associated with the LLM, the key-value cache being stored in a memory associated with the accelerator;
- a triggered operation logic unit to:
  - in response to the monitor logic unit detecting that the key-value cache is updated by the accelerator, transfer on behalf of the accelerator a copy of the key-value cache update to the storage node; and
  - notify the accelerator after the query is inferred and all updates of the key-value cache are transferred to the storage node to allow the key-value cache to be deleted from the memory and the memory to be used for storing key-value caches associated with other users;
- a query parser to parse a follow-up query from the user to determine a storage location on the storage node that stores the key-value cache corresponding to the user; and
- a cache-management logic unit to send a key-value (KV)-cache-transfer request to the second NIC, the KV-cache-transfer request specifying the storage location, thereby facilitating the second NIC to transfer the key-value cache corresponding to the user from the specified storage location to the memory.

* * * * *